(12) United States Patent
Afshar et al.

(10) Patent No.: US 8,705,518 B1
(45) Date of Patent: *Apr. 22, 2014

(54) APPARATUS AND METHOD FOR CONTROLLING SERVICES AND OPERATIONS IN CONVERGED COMMUNICATIONS NETWORKS

(75) Inventors: Siroos Afshar, Manalapan, NJ (US); Susan Roberta Bailey, Randolph, NJ (US); Bisrat Bulcha, Lebanon, NJ (US); Marian Rogers Croak, Fair Haven, NJ (US); Enrique G. Cuevas, Holmdel, NJ (US); Joubine Dustzadeh, Menlo Park, CA (US); Steve Fisher, Morristown, NJ (US); Samuel Glazer, New York, NY (US); Burwell Goode, Weston, CT (US); Barbara Joanne Kittredge, Brunswick, ME (US); Karen McGregor-Barnes, Manalapan, NJ (US); John T. Mulligan, Brick, NJ (US); Magda K. Nassar, Tinton Falls, NJ (US); Radhika R. Roy, Howell, NJ (US); Larry Arnise Russell, Atlantic Highlands, NJ (US); Anand Singh, Marlboro, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1068 days.

This patent is subject to a terminal disclaimer.

(21) Appl. No.: 10/785,714

(22) Filed: Feb. 24, 2004

Related U.S. Application Data

(60) Provisional application No. 60/449,403, filed on Feb. 24, 2003.

(51) Int. Cl.
*H04L 12/66* (2006.01)

(52) U.S. Cl.
USPC ............ 370/353; 370/422; 370/469; 370/522

(58) Field of Classification Search
USPC .......... 370/352, 353, 422, 469, 410, 467, 522
See application file for complete search history.

(56) References Cited

U.S. PATENT DOCUMENTS

| | | | |
|---|---|---|---|
| 6,363,065 B1 * | 3/2002 | Thornton et al. ............. | 370/352 |
| 6,636,596 B1 | 10/2003 | Gallant et al. | |
| 6,738,390 B1 | 5/2004 | Xu et al. | |
| 6,763,233 B2 | 7/2004 | Bharatia | |
| 6,879,680 B2 | 4/2005 | Donovan et al. | |
| 6,904,035 B2 * | 6/2005 | Requena ........................ | 370/338 |
| 6,940,847 B1 * | 9/2005 | Glitho et al. .................. | 370/352 |
| 6,940,862 B2 | 9/2005 | Goudreau | |
| 6,963,583 B1 | 11/2005 | Foti | |
| 7,002,989 B2 * | 2/2006 | Agrawal et al. ............... | 370/467 |
| 7,035,410 B1 | 4/2006 | Aiello et al. | |
| 7,062,032 B1 | 6/2006 | Bloom et al. | |
| 7,120,139 B1 | 10/2006 | Kung et al. | |

(Continued)

OTHER PUBLICATIONS

"AT&T Common VoIP Architecture," White Paper, Oct. 200.*

(Continued)

*Primary Examiner* — Yamane Mesfin
*Assistant Examiner* — Mon Cheri S Davenport

(57) ABSTRACT

Method and apparatus for providing integrated network and operations control for a converged communications network providing all service types on a common architecture.

20 Claims, 4 Drawing Sheets

(56) References Cited

U.S. PATENT DOCUMENTS

| | | | |
|---|---|---|---|
| 7,139,263 B2 * | 11/2006 | Miller et al. | 370/352 |
| 7,142,532 B2 | 11/2006 | Penfield et al. | |
| 7,177,646 B2 | 2/2007 | O'Neill et al. | |
| 7,257,109 B2 | 8/2007 | Sylvain | |
| 7,450,563 B2 | 11/2008 | Cook et al. | |
| 7,539,291 B2 | 5/2009 | D'Angelo et al. | |
| 7,664,102 B1 | 2/2010 | Samarasinghe | |
| 7,797,459 B1 * | 9/2010 | Roy et al. | 709/249 |
| 2002/0169883 A1 | 11/2002 | Bright et al. | |
| 2003/0211839 A1 | 11/2003 | Baum et al. | |
| 2003/0224781 A1 | 12/2003 | Milford et al. | |
| 2003/0231626 A1 | 12/2003 | Chuah et al. | |
| 2004/0109414 A1 | 6/2004 | Choi et al. | |
| 2004/0202295 A1 | 10/2004 | Shen et al. | |
| 2004/0203664 A1 | 10/2004 | Lei et al. | |
| 2004/0215787 A1 | 10/2004 | Gibson et al. | |
| 2005/0169244 A1 * | 8/2005 | Luken | 370/352 |
| 2005/0190721 A1 | 9/2005 | Pershan | |
| 2006/0203732 A1 * | 9/2006 | Covino et al. | 370/241 |
| 2007/0030843 A1 | 2/2007 | Miller et al. | |
| 2007/0237175 A1 * | 10/2007 | Benedyk et al. | 370/467 |
| 2008/0049783 A1 | 2/2008 | Habiby et al. | |
| 2008/0056243 A1 | 3/2008 | Roy et al. | |

OTHER PUBLICATIONS

"AT&T Common VoIP Architecture," White Paper, Oct. 2002.

Applegate, et al., "Making Intra-Domain Routing Robust to Changing end Uncertain Traffic Demands: Understanding Fundamental Tradeoffs" SIGCOMM '03, Aug. 25-29, 2003, Karlsruhe, Germany, 313-324.

* cited by examiner

APPARATUS AND METHOD FOR CONTROLLING SERVICES AND OPERATIONS IN CONVERGED COMMUNICATIONS NETWORKS

This application claims the benefit of U.S. Provisional Application No. 60/449,403 filed on Feb. 24, 2003, which is herein incorporated by reference.

The present invention relates generally to communication networks and, more particularly, to an apparatus and method for reducing costs and improving speed associated with operating a network, executing call control, and developing call control and service features, particularly applicable to complex networks supporting multiple service types, multiple service applications, and multiple traffic types.

BACKGROUND OF THE INVENTION

Traditionally, communications networks have grown and been developed around the needs of transporting a particular traffic type from one point to another, first with telegraph, later with voice, and most recently with a variety of data types (first analog-encoded data, and later digital and digitally encoded video). In general, each of these networks has evolved rather independently, with the traffic type and the peculiar operational and administrative requirements for that traffic type dictating the advances in network transport, call (or, more generally, circuit) control, operations and monitoring.

More precisely, PSTN has been used for sending real-time traffic like audio, and elaborate call control and service control mechanisms have been used for using circuit switches and TDM and SS7/ISUP signaling where no separation has been made between the call control and the media (or bearer) control. Later ATM network has been used for real-time multimedia (audio, video, data) communications with more sophisticated signaling mechanisms separating between the call control and media (or bearer) control where no clear specifications have been provided for service control using the well-defined complex call control ATM signaling protocol. Later on, H.323, SIP, MGCP, MEGACO, and other call control protocol have been standardized for packet telephony, and these call control protocols have been transport network agnostic. That is, they can run over LAN, IP, ATM, ATM and/or packet networks. In the transport network, it has been difficult to use all kinds of transmission facilities in a well-defined flexible way over which all call control protocols like SIP, H.323, MGCP, MEGACO, SS7/ISUP/analog/TDM, or others can be used in an integrated way that provide a complete uniform view for controlling of all call control protocols over all access and transmission technologies (e.g., Fiber/DSL/Cable, TDM/PSTN, LAN, IP, FR, ATM, wireless, satellite and others) offering services using a variety of different applications in a transparent and plug-and-play manner. Similarly, there have been no uniform operations and monitoring across all transmissions facilities, call control entities, and application servers of the network.

At times, integration between networks carrying the different traffic types progresses along one or more dimensions. For example, fiber optic transmission facilities are now largely, if not exclusively, employed for transmission of all communication network types (wireless networks notwithstanding). Similarly, some carriers have co-located Network Operations Centers (NOCs) for different services. Occasionally, NOCs employ integrated monitoring systems that are capable of associating the services and traffic carried with the facility. In these cases, troubles can quickly be associated with service type and customer.

Even with the achievements of integrating network types, integration along the dimension of network traffic control and service control has not advanced. Generally, services are still assigned fixed facilities, or parts of facilities within otherwise integrated transmission facilities, and the apparatus that controls traffic within the service domain remains logically if not physically (and usually both) separate from functionally similar apparatus that controls traffic for another service.

Therefore, a need exists for an apparatus and method for providing integrated connection and call control services, service resources, and network operations for modern, multi-service communications networks.

SUMMARY OF THE INVENTION

In one embodiment, the present invention reduces the cost and improves the utility of providing communications services by providing an improved, integrated architecture for network operations and for service development. More specifically, the present invention provides an infrastructure for real-time communications services over Internet protocol, commonly referred to as VoIP. This is accomplished through the architecture's Connectivity Layer, which consists of elements that provide network connectivity control based on service subscription and network operational parameters. Call control primitives are exchanged within the architecture to control the connectivity and provide service features for the complete spectrum of telecommunications services. The Connectivity Layer connects to an Applications Layer, where service features are developed and defined as a plurality of call control primitives. The services features are then implemented within the Connectivity Layer by the coordinated actions of its constituent elements and controllers.

The Connectivity Layer also connects to the Core Network Layer, which it controls to provide the physical and logical connections for the communication of data between parties. In one embodiment, the Core Network Layer is a single network that provide IP connectivity for the VoIP infrastructure.

More specifically, the Connectivity Layer connects to the Access Layer via border elements, which interface the various access facilities and service protocols to the Connectivity Layer for connection and service feature control. In one embodiment, the VoIP Connectivity Layer is surrounded with Border Elements (BEs), which mark the trust boundaries of the VoIP Infrastructure and translate the specifics of various VoIP access protocols into Session Initiation Protocol (SIP), i.e., the single common internal protocol used by all VoIP infrastructure components. Additionally, BEs not only provide protocol conversion, but may also enforce various policies including those needed for call admission control and VoIP-level security.

Finally, the operational support system (OSS) Systems provide an integrated operations environment, where native functions are defined and performed on the converged network.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention can relate to all communication networks, whether packet- or circuit-oriented, wireless or wired. It is expected to be of particular utility for what are known in the industry as "converged" networks, which are generally packet-oriented networks that support many service types. These networks may include, but are not limited to, voice switches for originating, transiting, and terminating the voice calls as well as routers or other data switching equipment (e.g., ATM or Frame Relay switches to route data traffic and provide traffic management functionality). The networks include control and signaling systems that use call-specific and as well as subscriber-specific information to determine how to route the calls as well as whether (and if so, how) to provide additional service features. The networks will also include transmission facilities which may include some or all of the following: an optical switch or optical cross connect network, an Asynchronous Transfer Mode (ATM) network, a Frame Relay network, a network of Multi-Protocol Label Switching (MPLS) enabled label switched routers, and a network of Lambda (optical wavelength) routers. This general architecture may be applied to traditional circuit-oriented converged networks as well as to packet-oriented converged networks (e.g., IP-based networks supporting VoIP, video, IP services, etc.).

These networks consist of a number of switches connected by communication links. There could be multiple links between a given pair of switches and not every possible pair of switches needs to be directly connected. Links could be of various sizes that are generally expressed in bandwidth units such as DS1, DS3, OC3, OC12, OC48, etc. In all such networks, circuits are provisioned between pairs of switches and numerous classes of services are carried on these circuits. Voice calls are connected through switches to other switches and to end (originating or terminating) switches, which are connected to the phones users employ to make the calls.

These networks are characterized by the fact that some intelligence is distributed in every switch and some is centralized in one or more central locations.

Any coordination of activities between switches is accomplished by sending control messages to each other in ways prescribed by the routing and signaling protocols. In the prior art, packet-based networks transmit the control messages along the same transmission paths used by the data and are distinguishable by their distinct header information (e.g., specific destination ID, control packet identified, etc.). In the prior art, traditional voice networks generally employ a separate signaling network, with distinct facilities, and even its own switches, to carry the signaling traffic.

Figure 1:
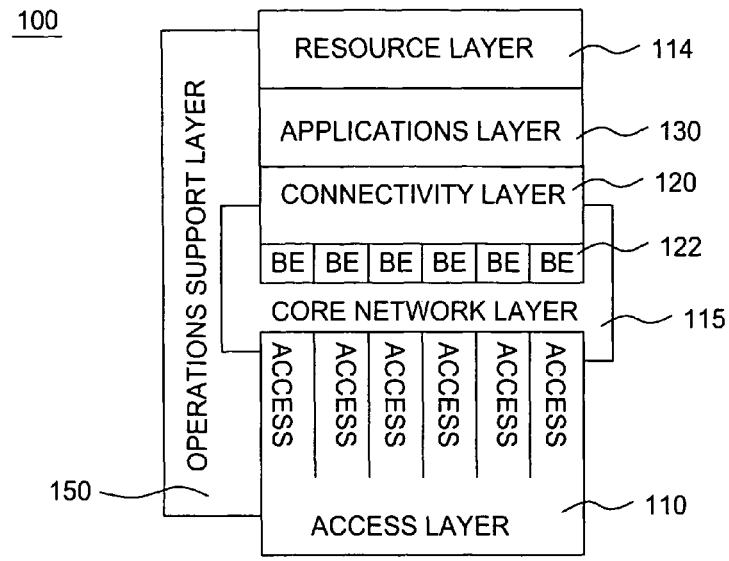
FIG. 1 illustrates a VoIP architecture of the present invention.

To better understand the present invention, FIG. 1 illustrates a VoIP architecture of the present invention. The VoIP architecture is devised in a series of Layers, as illustrated in FIG. 1. The layers follow the principle of information hiding; that is, each layer has a well-defined role and provides a set of well-defined capabilities to the layer to which it is sending information, by using the capabilities of the layer it received information from.

The Access Layer 110 interfaces with customer equipment and provides customer connectivity using access-specific protocols. The IP/MPLS Core Network Layer 115 provides IP connectivity for all elements of the VoIP infrastructure. The Connectivity Layer 120 provides the VoIP infrastructure needed to process basic calls, support high performance network functions, send network primitives, provide media services, interact with Application Servers for more advanced calls, and support Call Detail Recording. A plurality of Border Elements 122 deployed in the Connectivity Layer translate the access protocol to SIP. The Applications Layer 130 consists of several Application Servers, each providing one or more services. The Resource Layer 140 provides an environment for the creation of service logic and the management of services including customer record maintenance and billing plans. The Operations Support Layer 150 consists of multiple applications, databases, and a supporting data communications network, which are used by internal and external personnel to manage the VoIP network and its elements.

Figure 2:
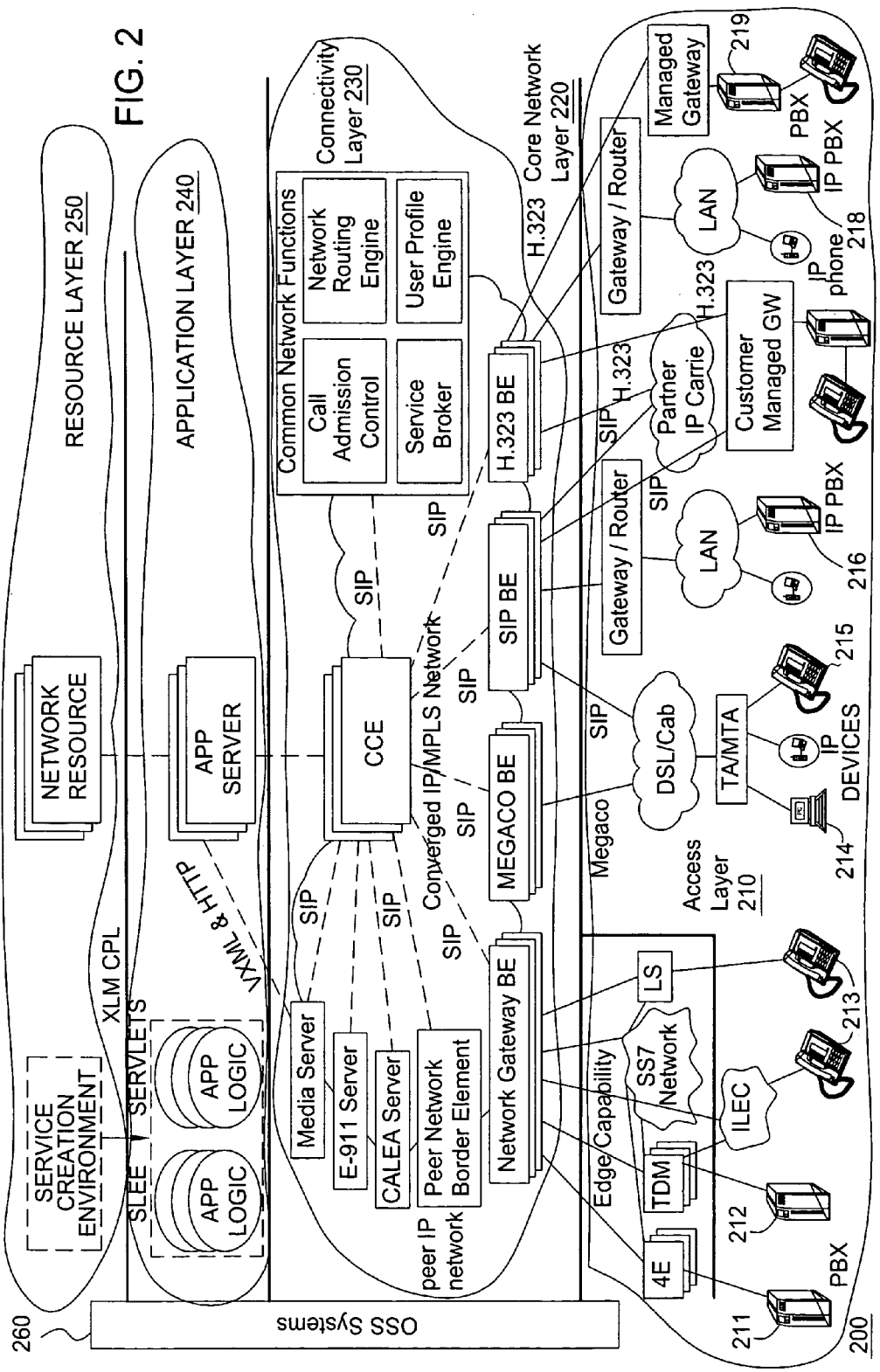
FIG. 2 illustrates the new network architecture comprising the Applications Layer, the Connectivity Layer, the Core Network Layer, the Access Layer, and the OSS Systems, with exemplary relevant constituent components of each layer.

FIG. 2 shows an exemplary communication network 200 of the present invention as a high-level VoIP functional architecture. Thus, the communication network 200 comprises a plurality of functional layers. The layers are logically connected. These layers may or may not be physically interconnected depending on the implementations. The Access Layer 210 provides connectivity between Customer Premises Equipment 211 through 219 inclusive, and the Core Network Layer 220. The Connectivity Layer 230 provides all network primitives needed for applications to implement services. It controls all the elements within the Core Network Layer 220 for providing service connectivity and features based on the users permissions, service parameters, and network conditions. The Connectivity Layer 230 also connects to the Application Layer 240 via common interfaces (e.g., SIP, VXML, or HTTP). The Application Layer 240 is the environment where service features are implemented. The Application Layer elements (e.g., servers, etc.) direct the Connectivity Layer 230 to set up, tear down, modify, or join call legs (among other functions). The Application Layer 240 also connects to the Resource Layer 250. The Resource Layer 250 contains elements that provide network resources (e.g., a directory or message store) that applications within the Application Layer 240 may contact to complete a network application. The OSS Systems Layer 260 contains the systems that provide the operations applications that network operators employ for network operations, such as configuration management, service and network provisioning, performance management, capacity management, and fault management.

It should be understood that the present invention can be employed in networks that provide only one or a few communications services. However, a principal aspect of the present invention is the power of a single integrated architecture for all communication services to reduce costs associated with controlling multiple services, especially when compared with the traditional single-service architectures or architectures with more limited integration. Service creation is also enhanced in that services implemented within the architecture may potentially be used by any of the integrated communications services without having to be separately developed and tested in different service architecture environments.

In addition, it should be understood that the present invention can be employed regardless of the Core Network Technology involved. That is, it applies to services provided by networks comprising traditional communications technology, as well as new networks based on Converged IP/MPLS Network technology.

In the prior art, communication networks contain separate network connectivity control domains for different groups of services. This invention is novel in defining a uniform architecture for connectivity control and application implementation for all services within a converged network.

More specifically, the present invention discloses the use of Border Elements. For each access type, a corresponding Border Element 232 is deployed to manage the access-specific requirements and interfaces. BEs are the demarcation points for the Connectivity Layer 230, which is a common and shared layer on top of the converged IP/MPLS network, or Core Network Layer 220.

Border Element (BE) identifies the Boundary of Trust for the VoIP Network and provides an entry point into the VoIP infrastructure. For each customer site, BEs will ensure reliability and availability. As the interface between a telephone service provider's internal address space and the customer site's address space, the BE is responsible for recognizing and authorizing end-points (IP-PBXs, SIP phones, etc.). Functionally, the BE can be logically decomposed or distributed, if needed. A configuration is supported in which the media-related processing of the BE takes place at a trusted CPE.

In one embodiment, a BE has four main functions: signaling, media control, security and call admission control.

In signaling, a BE proxies both the caller and the called end-points, thereby providing a point of signaling control at the edge. It translates the access protocol (H.323, MGCP, MEGACO, SS7, CAS, ISDN, etc.) to and from SIP. If the access protocol is SIP, no protocol conversion is needed.

In media control, a BE examines all media streams going in and out of the Connectivity Layer for security, media format conversion, and media transfer. The BE also redirects media streams upon request from the CCE without impacting the actual caller and called party, and provides the means for the CCE to define, detect and report DTMF strings during the call. Some services require the ability for the AS to detect a signal that does not need to be on the media path (e.g. DTMF, flash hook). For example, a prepaid card application may permit the caller to enter a sequence of digits (e.g. "**9). This forces a hang-up of the destination and provides the opportunity for another call to be placed. To enable efficient utilization of network resources for the non-call control type messages, the BE will allow an AS to register event triggers, and the BE will signal the AS when the event occurs.

In security, a BE provides all necessary security and screening for the customer sites it interacts with. It authenticates subscribers, customers, and partners, and provides NAT and firewall functions as appropriate.

In one embodiment, the BEs translate access protocols to SIP, and then provide call details to the Call Control Element (CCE) 234. The CCE manages the VoIP infrastructure and creates, removes, and joins call legs. To provide a service, the CCE invokes an Application Server (AS) 242, using SIP to communicate. By sharing a common architecture, new access technologies can use all existing and future ASs, and new ASs can support all existing and future access technologies. This architecture supports all real-time communications scenarios, like prepaid card, click-to-chat, and teleconferencing.

The Call Control Element (CCE) is responsible for providing a call leg view of the Connectivity Layer to the ASs. Working with the BEs, the CCE completely hides the specifics of the Access and Connectivity Layers from the ASs; allowing them to deal with logical end-points (users), call legs, and calls terminating at logical end-points. An AS can ask the CCE to establish a call leg to or from a logical end-point (user), to join call legs to form calls, and to tear down call legs and calls. The CCE does not need to interact with an AS to serve basic calls with no service features.

The CCE functions as a SIP Back-to-Back User Agent (B2BUA), and is a signaling end-point for all call legs with all BEs. Media paths, however, are established directly between BEs without going through the CCE.

Figure 4:
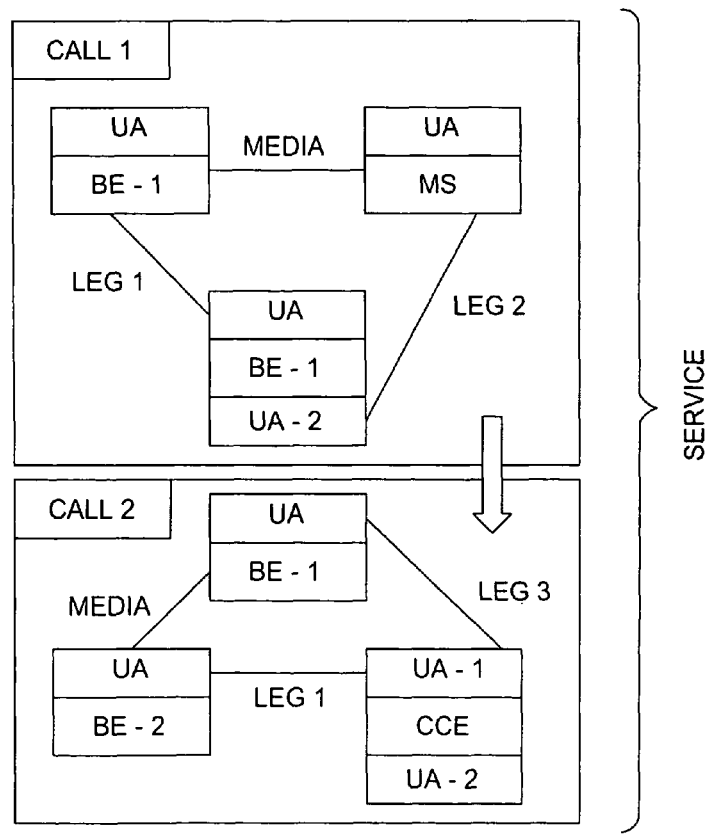
FIG. 4 illustrates call leg relationships.

FIG. 4 shows the relationship between call leg, call, and service. The CCE may receive a "call invocation" (SIP INVITE) from any BE on behalf of a subscriber, or from any server inside the network. An invocation has information about the caller, the called party, and characteristics of the call (preferences how to send/receive calls, class of service, media type, bandwidth, compression algorithm, etc.). The CCE may instruct a BE to redirect the media channels associated with a call to a different destination. A CCE manages all BEs in its zone. It is aware of the status of each BE it manages, including whether the BE is operational or congested. Moreover, the CCE enforces various routing policies, such as deciding which BE to use to set up a call leg.

The CCE interacts with the Service Broker (SB), the Network Routing Engine, (NRE), the User Profile Engine (UPE), and the Call Admission Control (CAC). In addition, the CCE also communicates with the resource servers residing in the Connectivity Layer, such as MS, E-911, and CALEA.

The CCE interacts with the SB to determine the services associated with a call leg (either in-bound or out-bound). For each call, the CCE provides relevant information and requests the AS to execute the corresponding service logic.

The CCE interacts with the NRE to translate a network address (such as an E.164 voice network address) or logical address to an IP address. The CCE uses the physical address of an end-point when considering BE availability, load, etc. A physical address consists of the IP address of a BE and all other information needed by the BE to locate the end-point in the address space it manages. Physical address characteristics include:

1) A local IP address, when a BE manages an IP address space;
2) Identification tokens, when a peer network is involved; and
3) The end user's telephone number for a PSTN.

Each network functional entity such as UPE, CAC, NRE, or SB is logically centralized, but is physically distributed across the whole network. Each network function will respond to the CCE within a specified time contacting the nearest physical instant of that particular functional entity. The reliability of each network functional entity needs to be very high because no failure of each network function is acceptable. That is, any physical instances of any network functional entity may fail, but still there will be some other physical entities of that particular function will remain operational.

All network functional entities such as UPE, CAC, NRE, and SB will share a common single physical global database. All entities will be able to store and/or retrieve data as they seem be appropriate for their own purposes individually or collectively. In other words, data stored by one entity can be used it or by other entities as they are needed. The global database, like any network functional entity, will also be logically centralized, but physically distributed in a way it will meet the required response time, performance, and reliability requirement. Like all network functional entities, the reliability of global database needs to be very high because no failure of database function is acceptable. That is, any physical instances of any database functional entity may fail, but the still there will be some other physical entities of the database function will remain operational.

The CCE may also consult with the NRE to learn the terminating BE's address. NRE will keep the addresses of all BEs across the whole network.

UPE will usually consist of SIP registrar server and Presence server, and all the user related information will be stored in the global database. Functional entities that can access the global database can retrieve those user related data stored by the UPE. The entities that like to interact with the UPE using the appropriate protocol (e.g., SIP PUBLISH/SUBSCRIBE/NOTIFY, SIP REGISTER, Presence/SIP protocol) to determine if a user is registered or logged-on, and to determine which address or number should be used to route the call.

The CCE interacts with the CAC to authorize users and admit calls at the time of call setup, leveraging network-wide conditions and policies. The CCE formulates the QoS/Bandwidth/SLA policy for network-wide resources in conjunction with the local policy and customer-specific requirements provided by the BE.

Policy information will be obtained from the lower IP network layer entity, like Bandwidth Broker/Router, to verify bandwidth is reserved, thus ensuring QoS before acceptance of the call (e.g., ringing will not be provided unless resources have been reserved).

Figure 3:
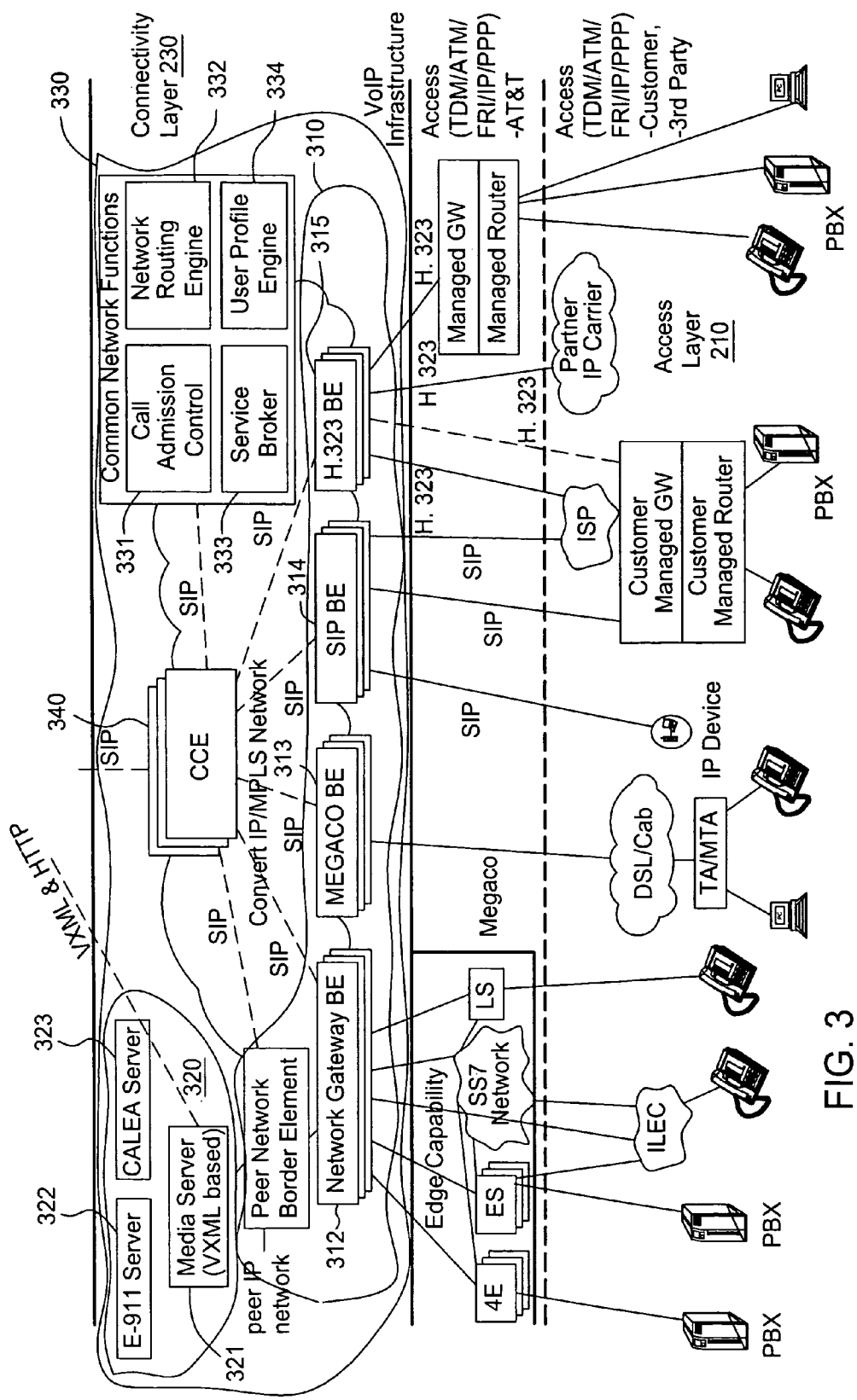
FIG. 3 illustrates the interaction between the Connectivity Layer and Access Layer in one embodiment of the present invention.

FIG. 3 illustrates the interaction of Connectivity Layer 230 and Access Layer 210 of FIG. 2 in greater detail. The Access Layer 210 provides connectivity between the Customer Premises Equipment (CPE) and the BEs, whereas the Connectivity Layer 230 provides all network primitives needed for applications to implement services.

More specifically, the Access Layer 210 must support the end users' service requirements such as quality of service (QoS), security, and availability. The present VoIP architecture is designed to provide customers with menus of services that are independent of access technologies. With the present architecture, new access technologies will be deployed quickly and efficiently without disturbing the existing VoIP infrastructure.

FIG. 3 illustrates the Access Layer 210 that is composed of a variety of exemplary access methods such as TDM via Edge Switching, TDM Direct Access, TDM via IP Direct Access, IP MIS, IP Broadband Agnostic, and IP peering.

In TDM via Edge Switching, customer access occurs via existing connections to edge switches, e.g., switches that deployed by a telephone service provider. This includes shared access from the ILEC and dedicated access to 4E or SE switches. Bearer and SS7 signaling for edge switches interface with the Network Gateway BE. The edge switches could support an IP interface, eliminating the need for TDM to IP conversion in the BE.

In TDM Direct Access, customer PBX or ILEC switches could interface directly to a Network Gateway BE. Full range of SS7, ISDN, CAS signaling needs to be supported.

In TDM via IP Direct Access (Managed Router/Gateway), a direct-access line shared with an IP Data Service, (e.g. MIS, MDNS, MRS, EVPN) in conjunction with a VoIP Gateway on the CPE Managed Router, is used to provide a TDM service demarcation on the customer's premises. QoS implementation is at Layer 3 for direct IP Access, and at both Layers 2 and 3 for FR/ATM access.

In IP MIS (Managed Router), a direct-access line shared with an IP Data Service, (e.g. MIS, MDNS, MRS, EVPN) in conjunction with a CPE Managed Router, is used to provide an IP service demarcation for VoIP service on the customer premises. VoIP protocols supported include SIP for SIP Phones or SIP Proxies and H.323 for IP PBXs. QoS implementation is at Layer 3 for direct IP Access, with possible additional Layer 2 QoS features for FR/ATM access.

In IP Broadband Agnostic, customer-purchased Broadband Access, (e.g. Cable, DSL) in conjunction with a Terminal Adapter provided by a telephone service provider, is used to provide Remote Office or second-line service to individual end users. End user devices can be SIP Phones, SIP Clients, Black Phones or other IP devices. For Black Phones, the Terminal Adapter will convert to VoIP. QoS is achieved by queuing mechanisms implemented in the Terminal Adapter. Privacy is achieved by IPSec sessions between the Terminal Adapter and BEs.

In IP Peering, a telephone service provider provides or purchases VoIP minutes over another VoIP carrier. Currently, the VoIP signaling protocol is H.323. Potential relationships with cable operators may introduce CMSS, a PacketCable variant of SIP. Encryption for Privacy can be implanted as an option.

Customer Premises Equipment (CPE) are end-point VoIP devices at customer locations. Examples include gateways, IP PBXs, and IP phones. CPE interfaces may comply with standard protocols such as SIP, MEGACO, MGCP, and H.323.

In FIG. 3 the Connectivity Layer 230 contains Border Elements 310, Servers 320, Common Network Functions 330 and Call Control Elements 340. The Connectivity Layer 230 connects to the Access Layer 210 and other Networks through Border Elements 310 via SIP (Session Initiation Protocol) using connection control primitives such as call ID, source-destination addresses of the required entities/devices/media, routing primitives, preferences, capabilities, and other parameters. There are several classes of Border Elements 310 depicted, with Peer Network Border Elements 311 providing paths to peered IP networks, Network Gateway Border Elements 312 providing paths to other carrier networks (generally trusted with greater permissions), MEGACO Border Elements 313 providing paths for Megacom voice services, SIP Border Elements 314 that interface to access links that already communicate via SIP, and H.323 Border Elements 315 that interface to access links that communicate via H.323. Other Border Elements may also be developed and used in this architecture. In general, Border Elements translate access protocols to and from SIP, enforce security, enforce admission policies (in conjunction with the Call Admission Control 231), detect DTMF and other in-band user requests, and redirect media when instructed to by a Call Control Element 340.

FIG. 3 also illustrates within the Connectivity Layer 230 connectivity to several Servers 320. Specific examples of Servers 320 include the Media Server 321, the E-911 Server 322, and the CALEA Server 323. The Media Server 321 handles and terminates media streams, providing functions such as announcements, DTMF (Dual Tone Multi-Frequency, more commonly known as TouchTone), text-to-speech, automatic speech recognition, bridging, and transcoding functions. The E-911 Server 322 routes emergency calls to the appropriate Public Safety Answering Points based on the caller's location. The CALEA Server 323 provides for the interception of communications for law enforcement and other purposes. The Servers 320 are all connected to the Call Control Elements 340 via SIP. Additionally, Media Servers 321 may be connected to Application Servers in the Application Layer 240 in FIG. 2 via VXML or HTTP to provide service applications.

FIG. 3 also illustrates within the Connectivity Layer 230 the Common Network Functions 330. The Call Admission Control 331, Network Routing Engine 332, Service Broker 333, and User Profile Engine 334 comprise the Common Network Functions 330. The Common Network Functions 330, while functionally distinct, may nonetheless share a hardware platform in some implementations. The Call Admission Control 331 enforces network-wide admission policies. The Network Routing Engine 332 provides route information and translates network addresses or logical addresses to the appropriate IP address. The Service Broker 333 provides to the Call Control Element 340, upon request, the address of the appropriate Application Server in the Application Layer (240 in FIG. 2) to serve a call. The User Profile Engine 334 contains user data, including registered devices, presence information, and geographical information.

FIG. 3 further illustrates within the Connectivity Layer 230 the Call Control Elements 340. Each Call Control Element manages the Core Network Layer through the Connectivity Layer 230 and creates, removes, and joins call legs. The Call Control Elements 340 communicate to Border Elements 310, Servers 320, Common Network Functions 330, and Application Servers in the Applications Layer 240 in FIG. 2. SIP is used in communications between the Call Control Elements 340 and the other elements in the Connectivity Layer 230. In general, a single Call Control Element controls all the Border Elements within a zone (defined geographically or otherwise), with each Border Element 310 assigned to only one Call Control Element 340. In other words, a Zone consists of a set of Border Elements 310 managed by one Call Control Element 340.

Namely, the Connectivity Layer 230 controls the network by instructing the elements (not shown) of the Core Network Layer 220 what endpoints to connect and what services to provide. In one embodiment, the Connectivity Layer 230 exclusively uses SIP for communicating among its functional processes, and uses SIP to communicate with the Core Network Elements it controls. Because the Connectivity Layer is a uniform, SIP-based environment for call processing and connection management it is insulated from modifications to protocols or calling devices in the Access Layer. If necessary, a new Border Element is defined to translate a new protocol in the Access Layer to SIP, or new capabilities developed atop an existing Access Layer protocol are added to the translation function of the corresponding existing Border Element. In either case, the core of the Connectivity Layer 230 is insulated.

Since the Connectivity Layer's functionality is defined by primitive functions, it remains unchanged even as complex features and functionalities are created within the Applications Layer 240 to control the Core Network Layer 220 via the Connectivity Layer 230. The primitive functions of establishing a call leg or multiple call legs, joining them, maintaining information about the status of the call legs, and tearing the legs down at the end of a call remain fundamental for any communication service. Again, the simplicity of the Connectivity Layer 230 insulates it and the Core Network from requiring modifications even as more complex services are created through the Applications Layer 240.

The Connectivity Layer uses the Call Control Elements 340 to recognize that a call request has been made and to use relevant information about the request to solicit information needed to establish the call legs and join them appropriately. The Call Control Elements 340 do not know how to establish the call inherently, but the Call Control Elements 340 are able to determine where to seek the information necessary to complete the call. Frequently, the information is solicited from the various modules comprising the Common Network Functions. Advanced services, however, may require information be obtained from the Applications Layer. By relieving the Call Control Elements of the functionality of determined what to connect (functionality performed by the Common Network Functions or the Applications Layer), the Call Control Elements can specialize on executing the connections based on the information they receive. Thus, the Call Control Elements can be designed to optimize speed in implementing network connections (either by improving the performance of the elements or by assigning more to the network and thus defining smaller "zones"). Common Network Functions can optimize speed in providing call completion instructions to the Call Control Elements. Thus, the Connectivity Layer provides a unified, shared environment that supports the addition of new services and access technologies without changing the basic infrastructure.

The connectivity layer use all kinds of transmission facilities in a well-defined flexible way over which all call control protocols like SIP, H.323, MGCP, MEGACO, SS7/ISUP/analog/TDM, or others can be used in an integrated way that provide a complete uniform view for controlling of all call control protocols over all access and transmission technologies (e.g., Fiber/DSL/Cable, TDM/PSTN, LAN, IP, FR, ATM, wireless, satellite and others) offering services using a variety of different applications in a transparent and plug-and-play manner. Similarly, it also provides the uniform operations and monitoring across all transmissions facilities, call control entities, and application servers of the network.

A description of an exemplary call flow is further instructive in considering the architecture. Using FIGS. 2 and/or 3 for clarification of the exemplary call flow, a call comes in from the Access Layer 210 to a Border Element 310. The Border Element 310 verifies that the caller is valid, and converts whatever protocol is used in the Access Layer to SIP for signaling and provides the interface between the access medium to the Core Network Layer. The Border Element 310 queries for caller authorization information by passing on caller information to the Call Admission Control function 331 via the Call Control Element 340. Based on the caller authorization information received (and presuming the call and associated features are permitted) the Border Element 310 connects the access medium to the Core Network Layer, providing any physical/link/network layer protocol (e.g., TDM/PSTN-IP, LAN/MAC-IP, ATM-IP, FR-IP) and call/application layer signaling protocol (e.g., H.323-SIP, SS7/ISUP-SIP, MGCP-SIP, MEGACO-SIP) conversion necessary. All functional entities of the connectivity layer such as BEs, CCEs, MSs and network functional entities (e.g., SB, UPE, CAC, and NRE) will use SIP protocol among themselves providing interoperability between the different access technologies for proving services by all ASs, as if plug-and-play manner, transparently with the help of the connectivity layer. For example, if any services need to be provided to end users to which the end users have subscribed to (e.g., FindMe, Conferencing services), the CCE will query the SB when the call comes to it via the BE to know which AS the call needs to be routed for providing services.) The Call Control Element 340 will query the Service Broker 333 to determine what service information applies to the call, or which Application Server in the Application Layer can provide handling information. If appropriate, the Call Control Element 340 will send commands to the Core Network Layer to route the call to a Media Server 321, for example for an announcement or to bridge a multipoint connection. More typically, the Call Control Element 340 queries the Network Routing Engine 332 to translate a network or logical address to an IP address to complete the call. The Call Control Element 340 can then control the Core Network Layer to route the call to a destination. Finally, the Border Element 310, the Call Control Element 340, and the Application Server generate data to the Call Control Element 340 so it may generate an integrated Call Detail Record for billing and operational recording purposes.

Figure 5:
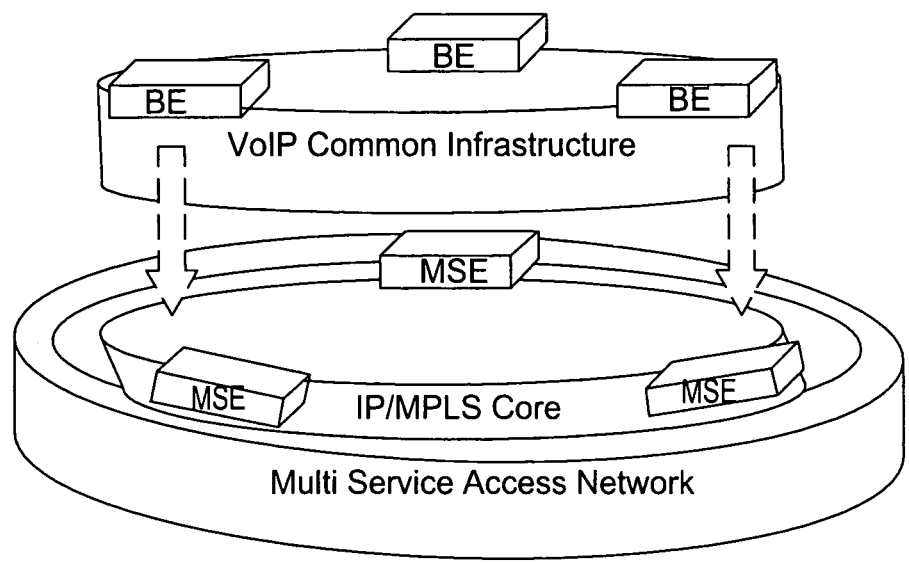
FIG. 5 illustrates another perspective of the VoIP architecture of the present invention.

To demonstrate the respective roles and responsibilities of various components (e.g., as shown in FIG. 5), the following simple example is provided. The architecture supports all real-time communications scenarios, like prepaid card, click-to-chat, and teleconferencing. Assume that caller A has subscribed to a service which requires a PIN to be presented for long distance calls. For a simplified basic call flow, the following steps are performed:

1. The caller's A's phone has been already registered with the network through A's assigned BE. The information about A is now updated in the Common Network Functions which, among other things, specifies how A is to be reached and A's preferences.
2. A initiates a call by sending a request to its BE using the appropriate access-specific signaling protocol messages.
3. The BE sends a SIP INVITE to the CCE with Request-URI for the destination's phone number. The CCE consults with the Service Broker, which indicates that for this caller's outbound calls application server S is to be invoked (we are assuming that S has the service logic to implement this example service) this call has no features.
4. CCE send an INVITE to S with information about the caller and the requested call.
5. S examines the called number and determines that this is indeed a long distance call and, therefore, the caller must provide a PIN in order for the call to be serviced.
6. S instructs the CCE to create a leg to media Server MS and to join the incoming leg with the newly created leg. S also communicates with MS and instructs MS to play a certain prompt ("please enter your PIN", for example), and to collect a 4-digit number.
7. The caller's A's phone has been already registered with the network through A's assigned BE. The information about A is now updated in the Common Network Functions which, among other things, specifies how A is to be reached and A's preferences.
8. A initiates a call by sending a request to its BE using the appropriate access-specific signaling protocol messages.
9. The BE sends a SIP INVITE to the CCE with Request-URI for the destination's phone number. The CCE consults with the Service Broker, which indicates that for this caller's outbound calls application server S is to be invoked (we are assuming that S has the service logic to implement this example service) this call has no features.
10. CCE send an INVITE to S with information about the caller and the requested call.
11. S examines the called number and determines that this is indeed a long distance call and, therefore, the caller must provide a PIN in order for the call to be serviced.
12. S instructs the CCE to create a leg to media Server MS and to join the incoming leg with the newly created leg. S also communicates with MS and instructs MS to play a certain prompt ("please enter your PIN", for example), and to collect a 4-digit number to the MS and to create a new leg to the called party, say, B.
13. CCE consults with the Common Network Functions to find out how B can be reached and presence preferences in effect for B, if any. This provides CCE with the address of the BE servicing B and with all other identifying information that BE needs to locate B.
14. The CCE sends an INVITE to the destination's BE, which communicates with the destination's device using the appropriate signaling protocol.
15. The call is set up between the two end-points, and the caller and destination called parties begin to communicate.
16. The destination B hangs up. The B's BE sends a SIP BYE to the CCE.
17. The CCE sends a BYE to caller's A's BE, which disconnects the caller.

In one embodiment, one or more of the layers, a portion of each layers, and/or components within each layer can be implemented using a general purpose computer or any other hardware equivalents. For example, one or more components within each layer may comprise a processor (CPU), a memory, e.g., random access memory (RAM) and/or read only memory (ROM), and various input/output devices (e.g., storage devices, including but not limited to, a tape drive, a floppy drive, a hard disk drive or a compact disk drive, a receiver, a transmitter, a speaker, a display, an output port, a user input device (such as a keyboard, a keypad, a mouse, and the like), or a microphone for capturing speech commands).

Thus, it should be understood one or more components within each layer can be implemented as a physical device or subsystem that is coupled to the CPU through a communication channel. Alternatively, one or more components within each layer can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory of the computer. As such, one or more components within each layer (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system for providing a voice over internet protocol architecture having a plurality of layers, comprising:
   a plurality of border elements within a connectivity layer of the voice over internet protocol architecture, wherein the plurality of border elements comprises a first border element and a second border element, wherein each of the first and the second border elements is tasked with interfacing with only one of a plurality of different access protocols, wherein the plurality of different access protocols comprises a circuit switched network protocol and a plurality of different packet network protocols, wherein each of the first and the second border elements translates a respective access protocol to a common protocol, wherein the respective access protocols of the first and the second border elements are different, wherein each of the plurality of border elements comprises a processor; and
   a call control element within the connectivity layer, wherein the call control element comprises a processor, wherein each of the first and the second border elements provides call details to the call control element in accordance with the common protocol.

2. The system of claim 1, wherein the common protocol is a session initiation protocol.

3. The system of claim 1, wherein each of the plurality border elements defines a boundary of trust for the voice over internet protocol architecture.

4. The system of claim 1, wherein each of the plurality border elements defines an entry point into the voice over internet protocol architecture.

5. The system of claim 1, wherein each of the border elements performs a signaling function.

6. The system of claim 1, further comprising an application layer comprising an application server, wherein the call control element interacts with the application server for processing a plurality call legs.

7. The system of claim 6, further comprising an access layer for interfacing with a customer equipment.

8. The system of claim 7, further comprising a resource layer for providing an environment for creation and management of services.

9. The system of claim 8, further comprising a core network layer for providing internet protocol connectivity for all elements within the voice over Internet protocol architecture.

10. A method for providing a voice over internet protocol architecture having a plurality of layers, comprising:
providing a connectivity layer within the voice over Internet protocol architecture having a plurality of border elements, wherein the plurality of border elements comprises a first border element and a second border element, wherein each of the first and the second border elements is tasked with interfacing with only one of a plurality of different access protocols, wherein the plurality of different access protocols comprises a circuit switched network protocol and a plurality of different packet network protocols, wherein each of the first and the second border elements translates a respective access protocol to a common protocol, wherein the respective access protocols of the first and the second border elements are different, wherein each of the plurality of border elements comprises a processor, wherein the connectivity layer further comprises a call control element, wherein the call control element comprises a processor wherein each of the first and the second border elements provides call details to the call control element in accordance with the common protocol.

11. The method of claim 10, wherein the common protocol is a session initiation protocol.

12. The method of claim 10, wherein each of the plurality border elements defines a boundary of trust for the voice over internet protocol architecture.

13. The method of claim 10, wherein each of the plurality border elements defines an entry point into the voice over internet protocol architecture.

14. The method of claim 10, wherein each of the border elements performs a signaling function.

15. The method of claim 10, further comprising:
providing an application layer comprising an application server, wherein the call control element interacts with the application server for creating, removing or joining a plurality call legs.

16. The method of claim 15, further comprising:
providing an access layer for interfacing with a customer equipment.

17. The method of claim 16, further comprising
providing a resource layer for providing an environment for creation and management of services.

18. The method of claim 17, further comprising:
providing a core network layer for providing internet protocol connectivity for all elements within the voice over internet protocol architecture.

19. The system of claim 1, wherein each of the border elements performs a media control function.

20. The method of claim 10, wherein each of the border elements performs a media control function.

* * * * *